United States Patent [19]
Moran

[11] 3,787,102
[45] Jan. 22, 1974

[54] STABILIZED TUBULAR COMPRESSIVE LOAD CARRYING LAMINATED BEARING

[75] Inventor: Michael W. Moran, McKean Township, Erie County, Pa.

[73] Assignee: Lord Corporation, Erie, Pa.

[22] Filed: Feb. 5, 1973

[21] Appl. No.: 329,945

[52] U.S. Cl. .................. 308/26, 267/57.1
[51] Int. Cl. ........................... F16c 27/06
[58] Field of Search... 308/26, 184; 267/57.1; 64/11

[56] References Cited
UNITED STATES PATENTS

| | | | |
|---|---|---|---|
| 3,083,065 | 3/1963 | Hinks et al. | 267/57.1 |
| 3,228,673 | 1/1966 | Hinks | 308/26 |
| 3,679,197 | 7/1972 | Schmidt | 308/26 |
| 2,900,182 | 8/1959 | Hinks | 308/26 |
| 2,752,766 | 7/1956 | Wildhaber | 64/11 |
| 3,504,903 | 4/1970 | Irwin | 308/26 |
| 3,690,639 | 9/1972 | Brandon | 267/57.1 |

Primary Examiner—Charles J. Myhre
Assistant Examiner—Barry Grossman

[57] ABSTRACT

A compressive load carrying laminated bearing comprising concentrically arranged inner and outer tubular bearing support members having disposed and circumferentially spaced therebetween in compressive load transmitting relation separate stacks of radially alternating bonded layers of resilient material and non-extensible material wherein at least one of the layers of non-extensible material is continuous and common to the separate and spaced stacks to provide increased lateral or buckling stability.

9 Claims, 2 Drawing Figures

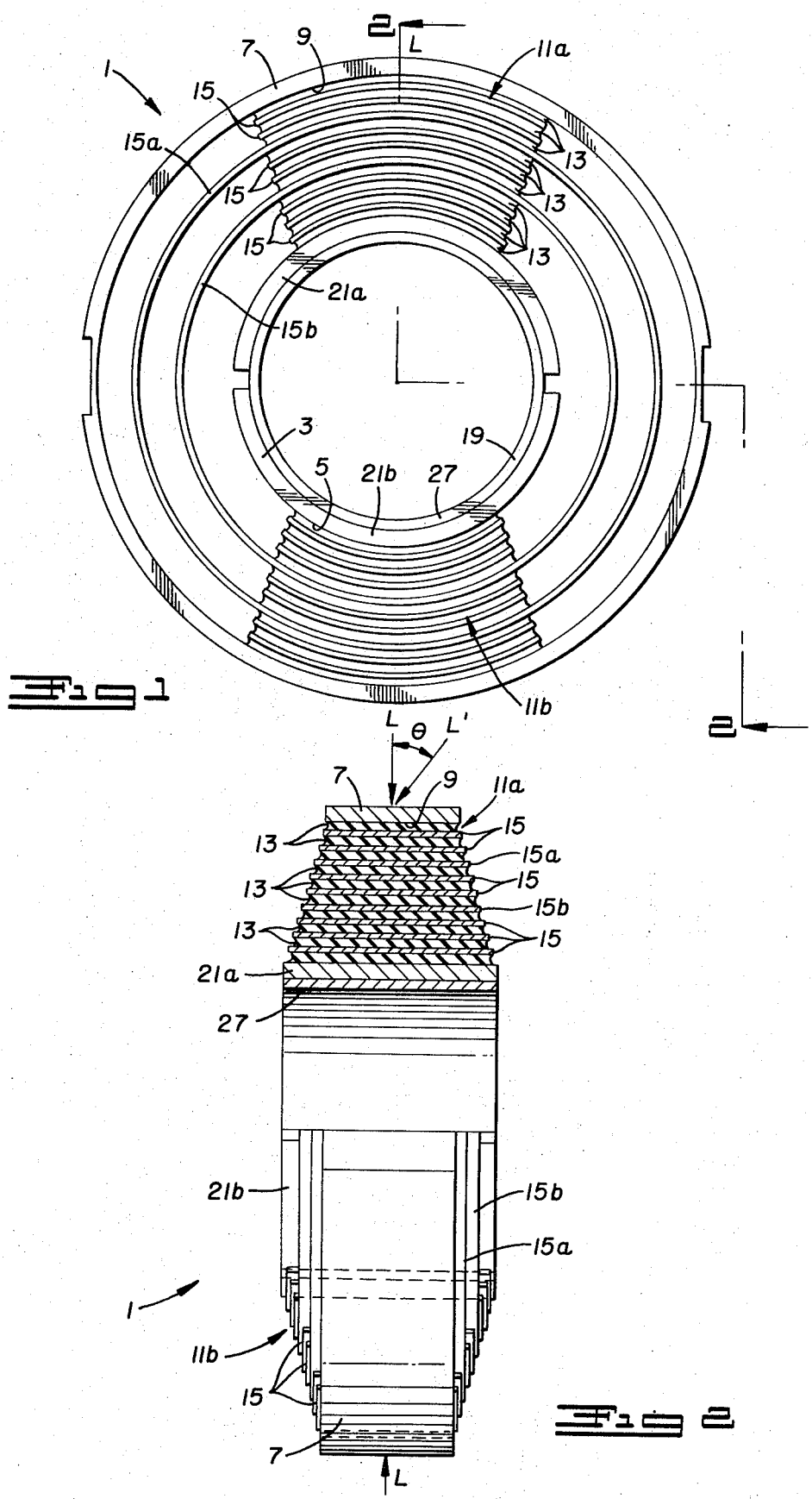

3,787,102

STABILIZED TUBULAR COMPRESSIVE LOAD CARRYING LAMINATED BEARING

BACKGROUND OF THE INVENTION

1. Field of the Invention

This invention relates to the field of bearings. More particularly, this invention relates to laminated bearings comprising alternating bonded layers of resilient material and non-extensible material. Bearings of this type are characterized in their ability to carrying high compressive loads normal or perpendicular to the layers while accommodating motion along the layers through yielding of the resilient material in shear and/or torsion.

2. Description of the Prior Art

It is known that the compressive load carrying ability of a layer of resilient material may be increased in a direction normal thereto many times through the inclusion of spaced parallel laminae of non-extensible material. That is, a given thickness of elastomer loses its compressive resilience increasingly with the increased number of layers it is divided by parallel laminae of non-extensible material such as metal. However, the ability of the elastomer to yield in shear or torsion in a direction along the layers is almost completely unaffected by the laminations. For a more detailed understanding of such laminated bearings and basic factors to be considered in their design, reference is made to Wildhaber, U.S. Pat. No. 2,752,766 and Hinks, U.S. Pat. No. 2,900,182.

While the above briefly described bearing concept has begun to find wide commercial application, many applications require a bearing design that is either inherently or due to its manner of loading subject to lateral instability or buckling.

Lateral instability or buckling may, in general, be characterized as the tendency of the laminations to bulge laterally out from under the applied compressive load and is analogous to the instability phenomenon experienced in overloaded structural columns. This tendency for lateral instability is enhanced by oblique loading of the laminations and any non-parallel relation of the laminations as may be introduced during manufacture. As would also be expected, the overall dimensions of the bearing play a very significant role in determining the inherent stability of any particular design.

While it is desirable to design these bearings dimensionally and geometrically such that lateral instability is not encountered in utilization, this is not always practical. Various confining techniques have been employed. However, typical confining means place other undesirable limitations on the performance of the bearing. Various means of confining the laminations against instability and/or means for reducing the tendency for instability have been disclosed in Hinks, et al, U.S. Pat. No. 3,083,065 and Hinks, U.S. Pat. No. 3,228,673. However, as will be apparent from a study of these patents, the approaches there disclosed are limited to specific geometrical designs and/or place undesirable limitations on the performance of the bearings.

BRIEF DESCRIPTION OF THE INVENTION

The present invention is directed to a specific bearing design employing an internal method of providing increased lateral stability or resistance to buckling without otherwise restricting its performance characteristics. More particularly, the bearing of the present invention is tubular and is suitable for carrying high compressive loads radially thereof while being relatively soft axially or laterally and torsionally for accommodating motion in these latter directions. The bearing includes concentrically spaced inner and outer tubular bearing support members. In the preferred embodiment the bearing is for carrying a uni-directional or restricted-directional radial compressive load. Two or more separate stacks of radially alternating bonded layers of a resilient material and a non-extensible material are uniformly spaced circumferentially of and between the inner and outer bearing supports in compressive load transmitting relation. Where only a uni-directional compressive load is to be carried, two diametrically opposed stacks in line with the compressive load may suffice and in fact may be preferred. Such an arrangement reduces the cost of manufacture of the laminated portion, efficiently utilizes the laminations and provides a bearing very soft axially or laterally and torsionally thereof.

Lateral stability is provided to the stacks by at least one and preferably a plurality of supportive laminae of non-extensible material which are continuous and common to the circumferentially spaced stacks. The supportive laminae are tubular and concentrically disposed intermediate the inner and outer support members. While providing lateral stability to the stacks, the desirable performance characteristics of the tubular bearing, namely ability to carry high radial compressive loads while being relatively soft axially and torsionally for accommodating motion, remain unaffected.

BRIEF DESCRIPTION OF THE DRAWINGS

FIG. 1 is a side view of one embodiment of a compressive load carrying laminated bearing of this invention.

FIG. 2 is a partly cross-sectional end view of the same embodiment taken along the line 2—2 of FIG. 1.

DESCRIPTION OF THE PREFERRED EMBODIMENT

Referring to the drawings, wherein like parts are designated by like numerals throughout, FIG. 1 shows a bearing 1 that comprises inner tubular bearing support means 3 having an outwardly facing convex surface 5 and an outer tubular support means 7 having an inwardly facing concave surface 9. In the present embodiment the tubular support means 3 and 7 and convex and concave surfaces 5 and 9 are cylindrical. However, for purposes of the present invention, the tubular support means 3 and 7 and/or convex and concave surfaces 5 and 9 may take on other geometrical forms such as frusto-conical and spherical depending on the compressive load to be carried and the motions to be accommodated.

The cylindrical bearing support means 3 and 7 are concentrically disposed with cylindrical surfaces 5 and 9 in radially spaced and opposed relation. At least two separate stacks 11a and 11b of radially alternating bonded layers of resilient material and non-extensible material are disposed and circumferentially spaced relative to each other between cylindrical surfaces 5 and 9 and fixedly secured in compressive load transmitting relation. It is preferred that the separate stacks 11a and 11b be identical in design and be circumferentially spaced uniformly between the concentric support means 3 and 7. In FIGS. 1 and 2, two separate stacks 11a and 11b are provided and are diametrically disposed between support means 3 and 7. Bearing 1 is for carrying a uni-directional compressive load L along a line passing through the central axis of the diametrically opposed stacks 11a and 11b. Since the stacks 11a and 11b are identical, only stack 11a will be described in detail.

Stack 11a comprises arcuate shaped radially alternating bonded layers of a resilient material 13 such as an elastomer, natural or synthetic, and similarly shaped layers of a non-extensible material 15 such as metal. It is desirable that all the layers 13 and 15 and surfaces 5 and 9 have coincident centers. It will be apparent that the stacks 11a and 11b can be operatively interconnected between the inner and outer support means 3 and 7 through other conventional techniques. It will be noted that the length (FIG. 2) of the layers 13 and 15 progressively decrease radially of the bearing 1 which tends to equalize the work of the various resilient layers 13 in accommodating cyclical axial and/or torsional motion and prevent preferential fatigue at the innermost resilient layer 13.

The design of the stacks 11a and 11b is such that there is a tendency for them to buckle or be laterally instable along an axis parallel to the longitudinal axis of the bearing 1 when subjected to radial compressive load L. In order to reduce this tendency for lateral instability or buckling, two of the non-extensible layers 15a and 15b are continuous and common to both of the separately spaced stacks 11a and 11b. As illustrated, the non-extensible layers 15a and 15b are evenly spaced between themselves and the inner and outer support members 3 and 7. The non-extensible layers 15a and 15b, as shown, are preferably cylindrically tubular and are concentrically disposed relative to the inner and outer cylindrical support means 3 and 7. It will be apparent that non-extensible layers 15a and 15b function as an integral part of the stacks 11a and 11b in providing compressive load carrying ability and do not interfere or confine the bearing 1 from accommodating motion axially or torsionally thereof. However, additional stiffness is provided to the stacks 11a and 11b against forces which would otherwise normally result in laterally instability or buckling. This increased stability is due to the cooperation between the separate stacks 11a and 11b through the continuous and common non-extensible layers 15a and 15b. This cooperation is perhaps best illustrated by considering a compressive load L' applied at some angle $\theta$ rather than radially, FIG. 2, against stack 11a. In this case the mid-portion of stack 11a tends to bulge in the direction of the load L'. However, the inclusion of the continuous and common non-extensible layers 15a and 15b transmit this bulging tendency in reverse to the other stack 11b where it is resisted. Bulging of the stacks 11a and 11b in opposite directions can only take place by deformation of the common non-extensible layers 15a and 15b. Operation of the bearing 1 is similar when the compressive load is applied against stack 11b.

With reference to FIG. 1, the inner bearing support means 3 is shown to comprise a cylindrical collar 19 defined by two slightly less than semi-cylindrical collar segments 21a and 21b. During manufacture, these collar segments 21a and 21b will normally be bonded to the innermost resilient layer 13 of the stacks 11a and 11b, respectively with clearance provided between adjacent ends. Due to the non-continuous nature of collar 19, the stacks 11a and 11b will be allowed to freely undergo some dimensional changes upon cooling after curing. This allowed dimension change minimizes residual stresses in the elastomer which can be detrimental to the life of the bearing.

The inner bearing support 3 also includes a rigid cylindrical member in the form of a tubular sleeve 27 that is inserted between the collar segments 21a and 21b. The sleeve 27 is preferably slightly larger in diameter than the inside of collar segments 21a and 21b whereby the stacks 11a and 11b are precompressed radially outward upon its insertion. This manner of installing sleeve 27 also results in a high frictional fit between the collar 19 and sleeve 27. It will be apparent that more rigid interconnection can be provided between the collar 19 and sleeve 27 by conventional means and in many applications is preferred to insure that slippage does not occur. This construction of the inner bearing support minimizes residual stresses remaining in the elastomer following cure, and allows for precompression of the stacks 11a and 11b to further relieve residual stresses. It will be apparent that the outer bearing support means 7 could be constructed and assembled in a similar manner, if desirable.

As shown in FIG. 1, there are two continuous and common non-extensible layers 15a and 15b. One continuous and common non-extensible layer will provide improved stability to the bearing and more than two common non-extensible layers may be used as necessary depending upon the designs of the stacks and the circumstances under which the bearing is utilized.

Construction of stacks 11a and 11b in general will be the same as for construction of the laminated bearings described in the above mentioned references. Basically thin layers of an uncured elastomer and thin layers of a non-extensible material such as steel of the prescribed geometry are alternately plied within the outer bearing support means 7 into an orderly sandwich or stack. The continuous and common layers of non-extensible material are added at the appropriate locations. Following assembly of the stacks, the collar portions 21a and 21b are located in place and the elastomer cured. While the elastomer will be bonded to some extent to the non-extensible layers, outer bearing support means 7, and collar segments 21a and 21b, solely due to curing of the elastomer, it is preferred that a conventional rubber to metal adhesive be additionally employed which bonds simultaneously with the curing of the elastomer. Following curing and cooling of the bearing, sleeve 27 may be inserted to precompress the stacks.

From the foregoing, it will be seen that there has been provided a compressive load carrying tubular laminated bearing having improved resistance to lateral instability or buckling. Also it will be seen that this improvement has been obtained without otherwise affecting the performance characteristics of the bearing. In addition, the bearing design of the present invention will provide greater versatility in the design of compressive load carrying laminated bearings and, thus, will advance their use in many applications not heretofore practical either from a design or economic viewpoint.

In the drawings and specification, there has been set forth a preferred embodiment of the invention and, although specific terms are employed, they are used in a generic and descriptive sense only and not for purposes of limitation.

What is claimed is:

1. A compressive load carrying laminated bearing comprising:
   a. inner tubular bearing support means having an outwardly facing convex surface;
   b. outer tubular bearing support means concentrically disposed about said inner bearing support means and having an inwardly facing concave surface radially spaced from and in opposed relation to said outwardly facing convex surface; and
   c. at least two separate stacks of radially alternating bonded layers of a resilient material and a non-extensible material secured and circumferentially spaced between said inner and outwardly facing surfaces in compressive load transmitting relation;
   d. at least one of said intermediate layers of non-extensible material being continuous and common to said separate stacks.

2. The bearing of claim 1 wherein said separate stacks are uniformly spaced circumferentially between said inner and outer tubular bearing support means.

3. The bearing of claim 1 wherein there are two separate stacks spaced between said inner and outer tubular bearing support means in diametrically opposed relation.

4. The bearing of claim 1 wherein opposite ends of said stacks are fixedly secured to said inner and outer tubular bearing support means.

5. The bearing of claim 1 wherein the layers of said stack are concentric and have centers coincident with the centers of said tubular bearing support means.

6. The bearing of claim 5 wherein at least one continuous and common layer of non-extensible material is tubular and concentric with said tubular bearing support means.

7. The bearing of claim 6 wherein said tubular bearing support means is cylindrical.

8. The bearing of claim 1 wherein said stacks are pre-compressed radially between said inner and outer bearing support means.

9. A compressive load carrying laminated bearing comprising:
   a. inner cylindrically tubular bearing support means having an outwardly facing cylindrical surface;
   b. outer cylindrically tubular bearing support means concentrically disposed about said inner bearing support means and having an inwardly facing cylindrical surface radially spaced from and in opposed relation to said outwardly facing cylindrical surface; and
   c. two separate stacks of radially alternating bonded layers of a resilient material and a non-extensible material fixedly secured and disposed between said inner and outwardly facing surfaces in diametrically opposed relation for transmitting compressive loads between said inner and outer bearing support means, said layers being concentric and having centers coincident with the centers of said tubular bearing support means;
   d. at least one of said intermediate layers of non-extensible material being cylindrically tubular and common to said separate stacks.

* * * * *